United States Patent [19]
Izzo, Sr.

[11] Patent Number: 5,418,696
[45] Date of Patent: May 23, 1995

[54] BICYCLE MOUNTED TURN-SIGNAL AND HORN

[76] Inventor: John J. Izzo, Sr., 56 Richmondville Ave., Westport, Conn. 06880

[21] Appl. No.: 199,791

[22] Filed: Feb. 22, 1994

[51] Int. Cl.⁶ .............................................. B62J 6/00
[52] U.S. Cl. ..................... 362/72; 362/418; 340/468
[58] Field of Search .............. 362/72, 285, 418, 431; 340/468, 474, 475

[56] References Cited

U.S. PATENT DOCUMENTS

| | | | |
|---|---|---|---|
| 2,788,763 | 4/1957 | Ries | 362/72 |
| 2,931,028 | 3/1960 | Propst | 362/72 |
| 3,484,743 | 12/1969 | Stancil et al. | |
| 3,878,387 | 4/1975 | Kovacic | |
| 3,950,727 | 4/1976 | Smith | 362/72 |
| 4,051,361 | 9/1977 | Lichon et al. | 362/72 |
| 4,099,159 | 7/1978 | Windisch | |
| 4,204,191 | 5/1980 | Daniels | 362/72 |
| 4,711,381 | 12/1987 | Felder | 362/72 |
| 4,899,023 | 2/1990 | Shu-Hwa | |
| 5,197,795 | 3/1993 | Mudrowich | 362/72 |
| 5,276,593 | 1/1994 | Lighthill et al. | 362/72 |

*Primary Examiner*—Richard R. Cole
*Attorney, Agent, or Firm*—David L. Baker; Rhodes & Ascolillo

[57] ABSTRACT

A signaling apparatus for attachment to a bicycle thereon, including a cylindrical housing member, having first and second telescoping shaft members slidingly engaged within opposite ends of the cylindrical housing member. A right signal light assembly is disposed on a distal end of the first telescoping shaft member, and a left signal light assembly is disposed on a distal end of the second telescoping shaft member. There is a clamping mechanism for removably attaching the cylindrical housing member to a seat mounting post on the bicycle. A switching circuit selectively controls illumination of the right and left signal light assemblies, and is electrically connected to the same.

3 Claims, 4 Drawing Sheets

BICYCLE MOUNTED TURN-SIGNAL AND HORN

BACKGROUND OF THE INVENTION

1. Field of the Invention

The present invention generally relates to a bicycle mounted combination turn-signal and horn apparatus and, more particularly but not by way of limitation, to such an apparatus having telescoping arms, on the ends of which are mounted signal lights.

2. Description of the Related Art

U.S. Pat. No. 3,484,743 relates to a single bank of lights extending across the front and rear of a motorcycle. A selectively operable switch mechanism, having a single reversible motor, progresively energizes the lights of each bank from one side to the other, depending on whether the operator desires to give a left or right turn signal.

U.S. Pat. No. 3,878,387 discloses a stop light system for bicycle brakes embodying a battery pack and an electrical signal lamp appropriately mounted on the bicycle frame. A contact element is positioned for engagement with one of the removable brake shoe levers of the bicycle. The contact, when engaged by the brake shoe lever, completes an electrical circuit through the signal lamp, thus illuminating the same.

U.S. Pat. No. 4,099,159 relates to a light signalling device provides for use with bicycles and includes a housing and a cover mounted on the housing. The cover includes a plurality of light peneterable portions, with light emitting lamps mounted in the housing for separately illuminating each light penetrable portion. A multi-positionable switch is connected for controlling illumination of the light penetrable portions in various ways.

U.S. Pat. No. 4,899,023 relates to a bicycle brake light switch control assembly, suitable for mounting on most types of bicycle brakes. The device controls the turning on and off of an associated bicycle brake light in accordance with the operation of the bike brake. Upon application of a braking force, braking cables are contracted, forcing a sliding sleeve of the invention to displace further into a socket. This causes two conductive plate springs to come into contact with a conductive tube, thereby completing an electric circuit and inducing the brake light to turn on. By releasing the brake, electrical contact is ultimately broken, thus causing the brake light to turn off.

SUMMARY OF THE INVENTION

Bicycles are as popular today as they have been over the years, perhaps even more so. They are used for a variety of purposes such as transportation and for exercise, and are designed for a number of different surfaces such as asphalt or mountainous terrain. Accordingly, it may be desirable to utilize various safety signaling features on a bicycle when riding on busy streets, yet remove them in unnecessary situations such as trail riding. In this manner, a signaling system is less susceptible to damage when riding on rough terrain, if stored in a compact manner or if removed altogether.

While there are already several bicycle signaling systems in existence, none appear to incorporate the various features described herein.

Accordingly, it is a principal object of the present invention to provide a bicycle signaling device capable of signaling others from both the front and rear of the bicycle.

It is another object of the present invention to provide a bicycle signaling device which is more easily seen by motorists and pedestrians.

It is a further object of the present invention to provide directional indication, caution indication, stopping indication, and a horn warning to motorists and pedestrians.

It is still a further object of the present invention to provide a signaling device which is relatively compact, easily detachable, and portable.

The present invention achieves the above objects, among others, by providing, in one aspect, a signaling apparatus for attachment to a bicycle thereon. It includes a cylindrical housing member and a telescoping shaft member slidingly engaged within the cylindrical housing member. There is an illumination mechanism for creating a visible signal, which is disposed on a first end of the telescoping shaft member. A clamping mechanism removably attaches the cylindrical housing member to a seat mounting post on the bicycle, and a switching mechanism which is electrically connected to the illumination mechanism selectively turns it to an "ON" and an "OFF" position.

Preferably, the illumination mechanism includes a barrel shaped housing having front and back open ends, a lamp stationed within the barrel shaped housing, and front and back lens coverings positioned over the front and back open ends, respectively, whereby the lens coverings permit light produced from the lamp to pass therethrough. The front and back lens coverings preferably comprise a colored, light penetrable material.

In another aspect, the invention generally features a signaling apparatus for attachment to a bicycle thereon. It includes a cylindrical housing member, having first and second telescoping shaft members slidingly engaged within opposite ends of the cylindrical housing member. A right signal light assembly is disposed on a distal end of the first telescoping shaft member, and a left signal light assembly is disposed on a distal end of the second telescoping shaft member. There is a clamping mechanism for removably attaching the cylindrical housing member to a seat mounting post on the bicycle.

A switching mechanism for selectively controlling illumination of the right and left signal light assemblies performs the following functions: (a) illuminating only the right signal light assembly in a flashing, intermittent manner; (b) illuminating only the left signal light assembly in a flashing, intermittent manner; (c) simultaneously illuminating both the right and left signal light assemblies in a flashing, intermittent manner; and (d) simultaneously illuminating both the right and left signal light assemblies in a continuous manner.

In addition, the right and left signal light assemblies further include a barrel shaped housing having front and back open ends, a lamp stationed within the barrel shaped housing, and front and back lens coverings positioned over the front and back open ends, respectively, whereby the lens coverings permit light produced from the lamp to pass therethrough. Preferably, the front and back lens coverings further include a colored, light penetrable material.

The switching mechanism has a battery pack assembly firmly attached to a front surface of the cylindrical housing member, and a switch unit for mounting on a handle bar assembly of the bicycle. A wiring mechanism connects the switch unit to the battery pack assembly, and also to each of the right and left signal light assemblies. Additionally, the switch unit has a generally square shaped switch housing, a toggle lever protruding from a top surface of the switch housing, and a plurality of pushbuttons mounted on a front surface of the switch housing.

The toggle lever controls the functions of: (a) illuminating only the right signal light assembly in a flashing, intermittent manner; and (b) illuminating only the left signal light assembly in a flashing, intermittent manner.

A first pushbutton controls the function of: (c) simultaneously illuminating both the right and left signal light assemblies in a flashing, intermittent manner.

A second pushbutton controls the function of: (d) simultaneously illuminating both the right and left signal light assemblies in a continuous manner.

The apparatus further includes an electrically operated horn which is firmly attached to a rear surface of the cylindrical housing, with the horn being activated by a third pushbutton mounted to the front surface of the switch housing. Finally, the clamping mechanism includes a pair of opposing C-shaped clamps attached to the battery pack, with the clamps being tightened by turning a screw protruding through substantially straight portions of each of the opposing C-shaped clamps.

DESCRIPTION OF THE PREFERRED EMBODIMENT

Figure 1:
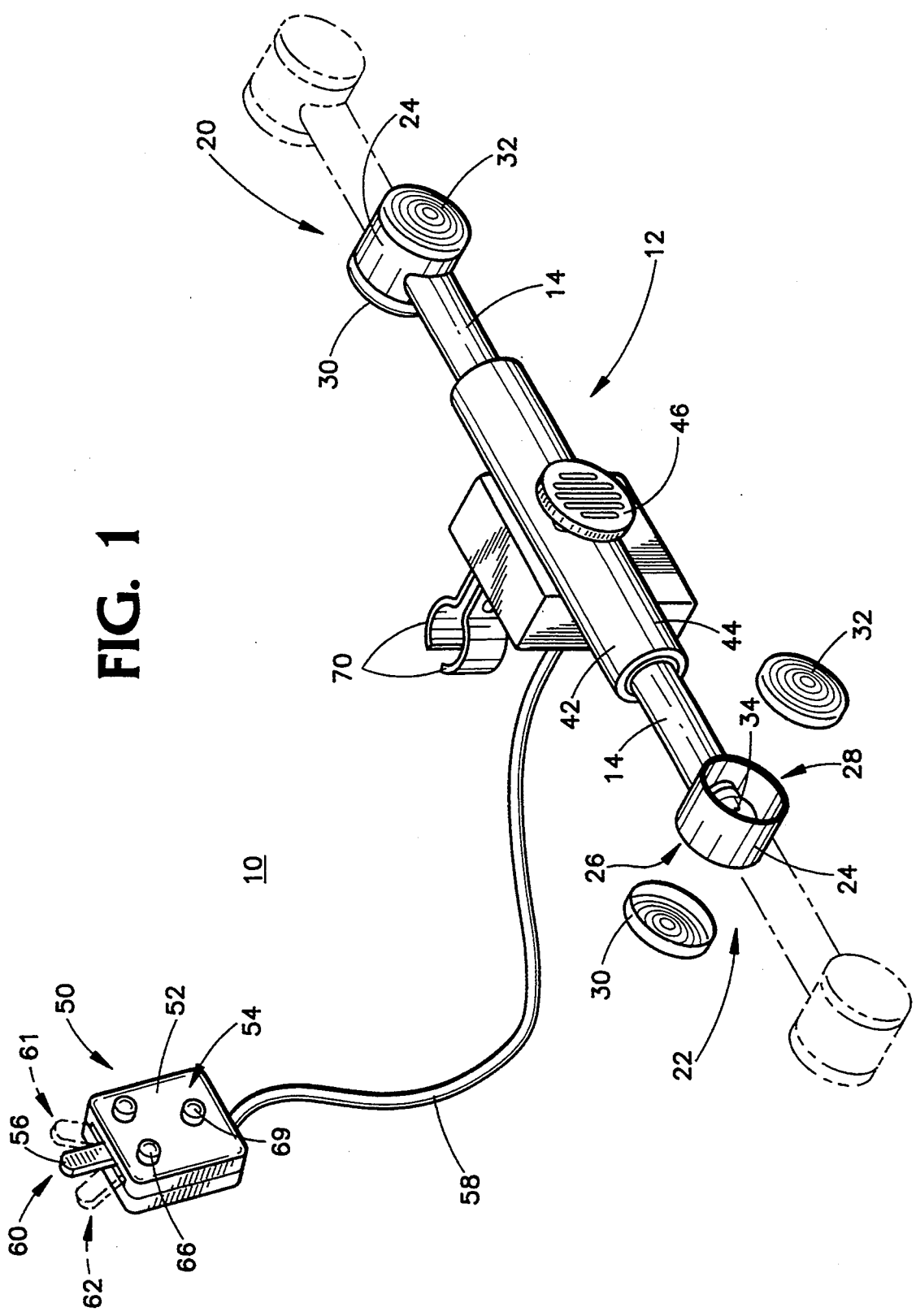
FIG. 1 is a perspective view of the bicycle signaling apparatus according to the present invention, with one of the signal light assemblies being shown in exploded perspective, and illustrating the telescoping feature of the shafts to which the light assemblies are mounted.

Referring initially now to FIG. 1, there is shown a bicycle signaling apparatus generally designated by the reference numeral 10. The apparatus 10 includes a cylindrical housing member 12 having a pair of generally hollow telescopic shafts 14 and 16 protruding from opposite ends therein. Located at the distal ends of each of the telescoping shafts 14 and 16 are right and left signal light assemblies 20 and 22, respectively. As both right and left signal light assemblies 20 and 22 are identical in construction, only one shall be described in further detail, for simplicity's sake.

Figure 3:
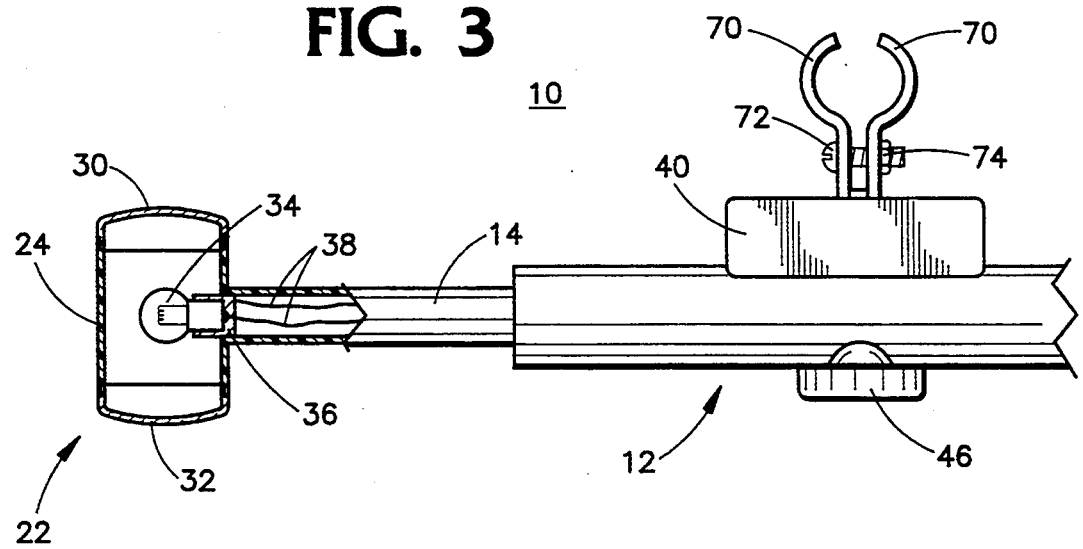
FIG. 3 is a top view of the bicycle signaling apparatus according to the present invention, partially cut away and partially in cross-section, illustrating the configuration of one of the signal light assemblies.

Right signal light assembly 20 has a generally barrel shaped outer housing 24, with the housing having open front and back ends 26 and 28. Covering the front and back open ends 26 and 28 are front and back lens coverings 30 and 32. The coverings 30 and 32 are preferably made from a colored, light penetrable material ordinarily found on standard automobile taillight assemblies. Disposed within the barrel shaped housing 24 is an ordinary lamp 34 for providing the necessary illumination used in the signaling functions of the apparatus 10. As seen in FIG. 3, the lamp 34 is mounted in a socket 36, located at the junction between the telescoping shaft 14 and the barrel shaped housing 24. Associated wiring 38 runs from the socket 36 and the telescopic shaft 14 to make the appropriate electrical connections, discussed in greater detail hereinafter.

Referring again to FIG. 1, a battery pack housing 40 is attached to the front surface 42 of the cylindrical housing member 12. The battery pack housing 40 is suitable for containing a battery 43 (shown schematically in FIG. 3) and any other components necessary to facilitate the desired electrical operations of the present invention. Disposed on the rear surface 44 of the cylindrical housing member 12 is an electrically operated horn 46, a type of which is well known in the art.

A switch unit 50 is provided for selectively controlling various illuminating functions of the apparatus 10. The switch unit 50 includes a generally square shaped switch housing 52 having a plurality of pushbutton switches on its face, as at 54. There is also a toggle lever switch 56 protruding from the top of the switch housing 54. Finally, a cord 58 is provided to electrically connect the switch unit 50 to the battery pack housing 40.

Figure 4:
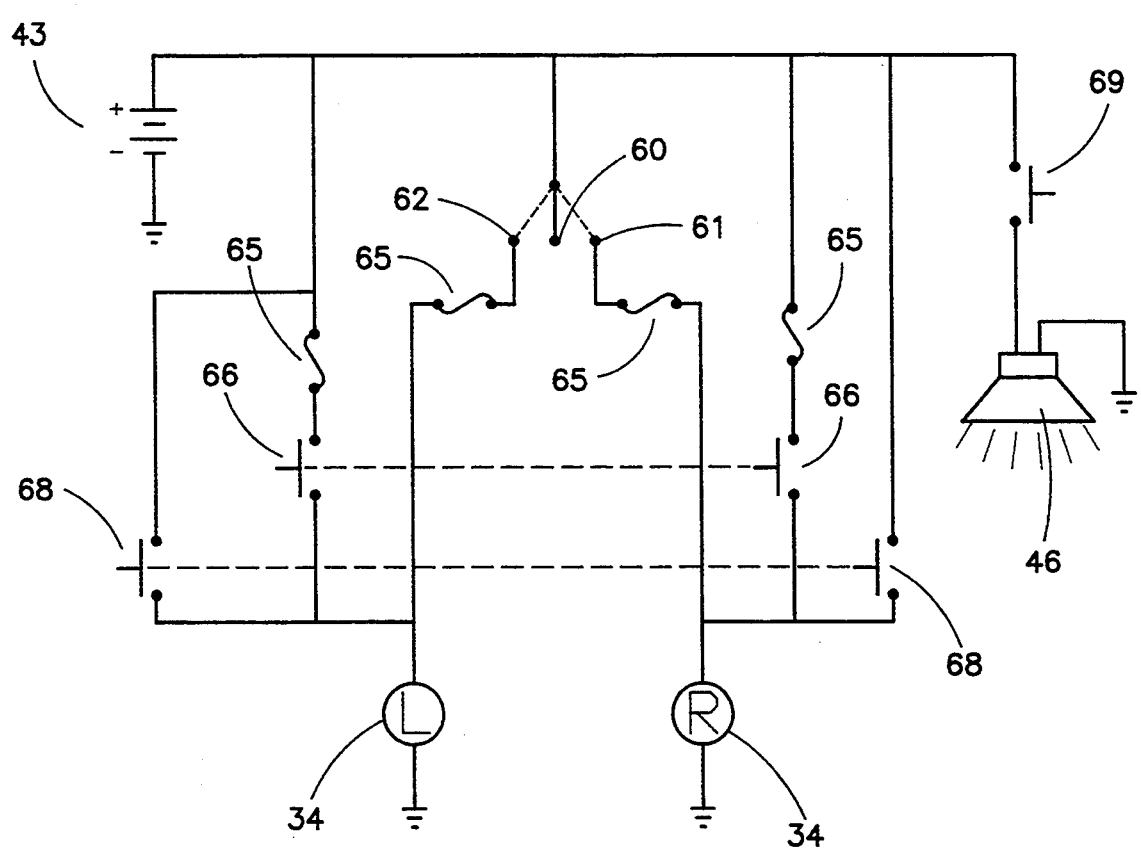
FIG. 4 is a wiring schematic of the bicycle signaling apparatus according to the present invention.

As disclosed, the apparatus 10, in its present embodiment, is designed to perform the following functions, which are best understood by referring to FIGS. 1 and 4:

First, the operator may illuminate only the right signal light assembly 20 in a flashing, intermittent manner, signaling the operator's desire to make a right turn. This is accomplished by flipping the toggle lever switch 56 from the neutral position 60 to the right turn position 61. A circuit is completed from the positive terminal of the battery 43, through a flashing element 65, and to the right signal lamp 34. The flashing element 65 may consist of a bimetallic strip or any other group of solid state components which causes the lamp 34 to flash in an intermittent manner. These devices are common and well known in the art.

Second, the operator may illuminate only the left signal light assembly 22 in a flashing, intermittent manner, signaling the operator's desire to make a left turn. This function is accomplished in manner similar to the right turn function. This time, the toggle lever switch 56 is flipped to the left turn position 62, and a circuit is completed from the positive terminal of the battery 43, through another flashing element 65, and to the left; signal lamp 34.

Third, the operator may simultaneously illuminate both the right and left signal light assemblies in a flashing, intermittent manner, signaling the operator's desire to display a caution signal. This function is accomplished by depressing a first pushbutton switch 66 on the switch housing 52, causing a completed circuit through additional flashing elements 65 to both right and left signal lamps 34.

Fourth, the operator may simultaneously illuminate both the right and left signal light assemblies in a continuous manner, signaling the operators desire to display a stop signal. This function is accomplished by depressing a second pushbutton switch 68 on the switch housing 52, causing a completed circuit through both right and left signal lamps 34.

Finally, as seen from FIG. 3, the operator can sound the horn 46 by simply depressing a third pushbutton switch 69 on the switch housing 52.

Figure 2:
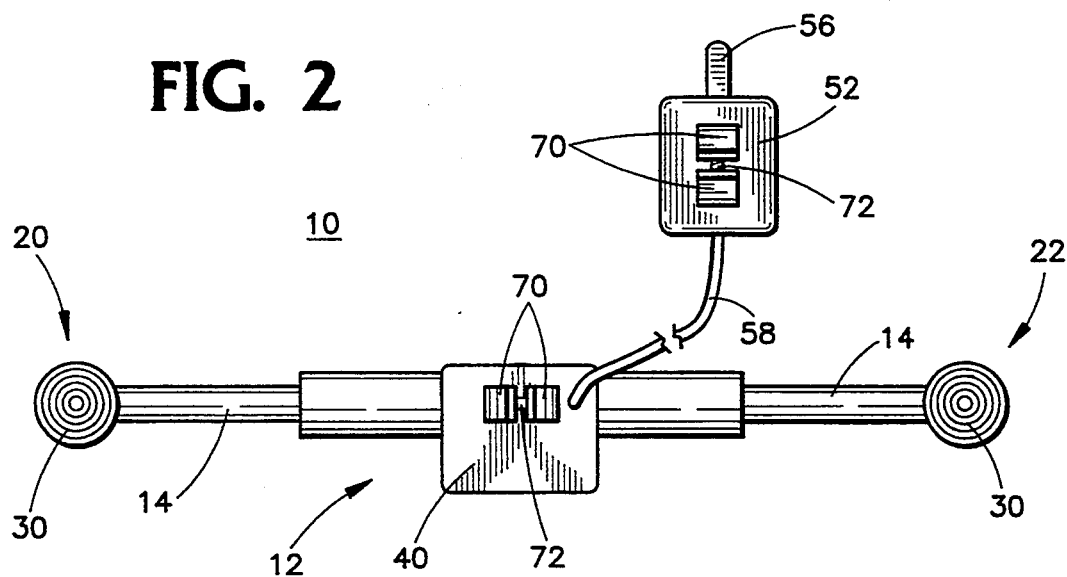
FIG. 2 is a rear view of the bicycle signaling apparatus according to the present invention, illustrating the orientation of the clamping members.
Figure 5:
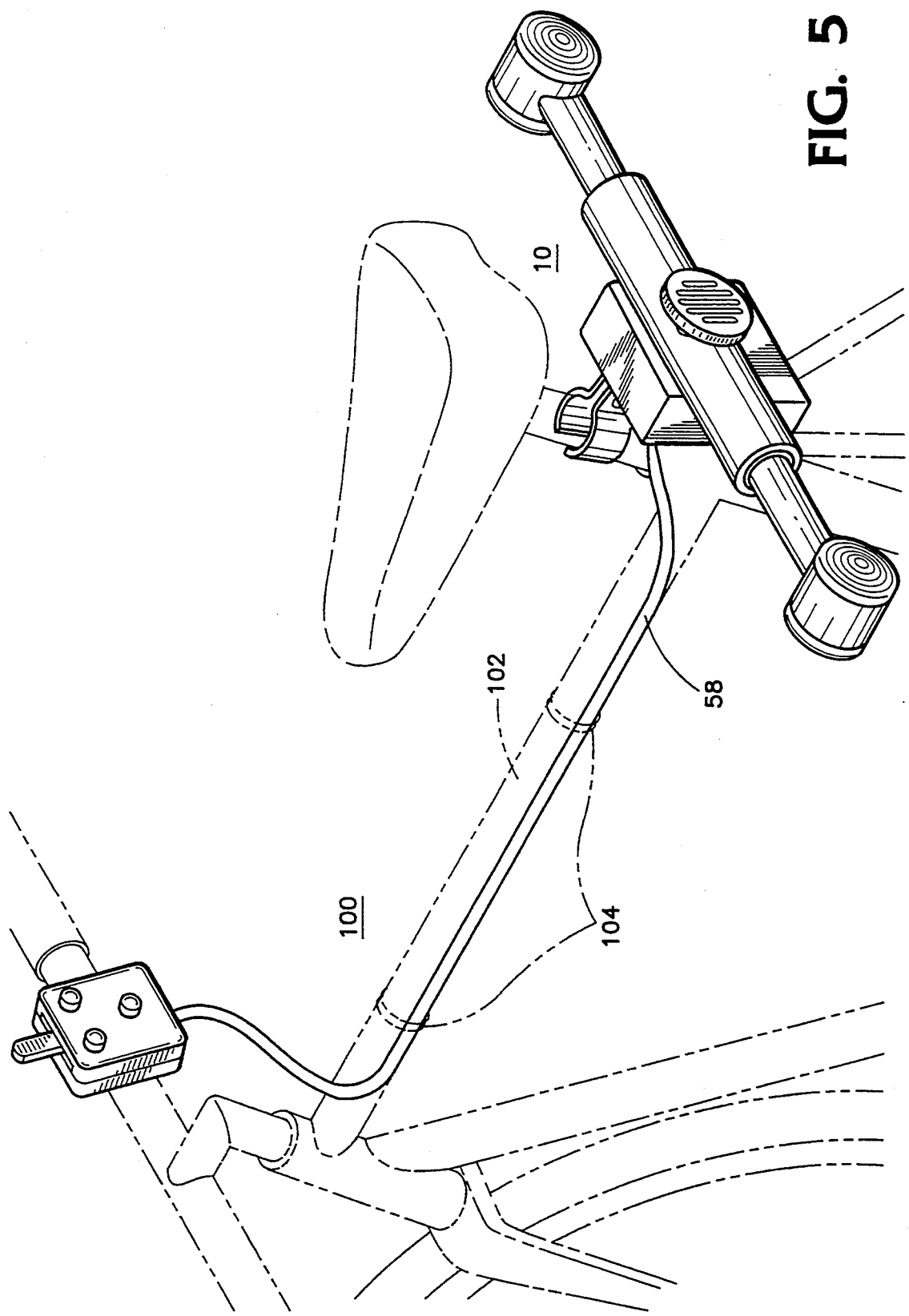
FIG. 5 is a perspective view of the bicycle signaling apparatus according to the present invention, illustrating its installment on a bicycle, shown in phantom.

Attachment of the apparatus 10 to a typical bicycle is accomplished through the use of a pair of opposing C-shaped clamps 70. A pair of clamps 70 is shown attached to the back of the battery pack housing 40 in FIG. 3, and having a screw 72 protruding through substantially straight portions of the clamps 70, with a fastening nut 74 on one end of the screw for adjustably tightening the clamps. As seen in FIG. 2, the switch unit 50 also has a pair of the above described clamps 70 for attachment to the handlebars of a bicycle thereon. FIG. 5 shows the apparatus as installed on a bicycle 100. The cord 58, as shown in FIG. 5, can be secured to the crossbar 102 of the bicycle 100 with the use of ties 104, which may be of any type known in the art.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A signaling apparatus for attachment to a bicycle thereon, comprising:
   (a) a cylindrical housing member;
   (b) a telescoping shaft member slidingly engaged within the cylindrical housing member;
   (c) a first end on the telescoping shaft member;
   (d) an illumination means;
   (e) a visible signal created by the illumination means;
   (d) the illumination means disposed on the first end of the telescoping shaft member;
   (e) the illumination means further comprising:
      a barrel shaped housing;
      front and back open ends on the barrel shaped housing;
      a lamp stationed within the barrel shaped housing; and
      front and back lens coverings positioned over the front and back open ends, respectively, whereby the front and back lens coverings permit light produced from the lamp to pass therethrough;
   (f) a seat mounting post on the bicycle;
   (g) a clamping means for removably attaching the cylindrical housing member to the seat mounting post on the bicycle;
   (h) a switching means;
   (i) an "ON" position and an "OFF" position in the switching means;
   (j) the switching means being utilized for selectively turning the illumination means to the "ON" position and an "OFF" position; and
   (k) the switching means being electrically connected to the illumination means.

2. The signaling apparatus as defined in claim 1, wherein the front and back lens coverings further comprise a colored, light penetrable material.

3. A signaling apparatus for attachment to a bicycle thereon, comprising:
   (a) a cylindrical housing member;
   (b) a front surface on the cylindrical housing member;
   (c) first and second telescoping shaft members slidingly engaged within opposite ends of the cylindrical housing member;
   (d) a right signal light assembly disposed on a distal end of the first telescoping shaft member;
   (e) the right signal light assembly further comprising:
      a right barrel shaped housing having front and back open ends;
      a lamp stationed within the right barrel shaped housing; and
      front and back lens coverings positioned over the front and back open ends, respectively, whereby the front and back lens coverings permit light produced from the lamp to pass therethrough;
   (f) a left signal light assembly disposed on a distal end of the second telescoping shaft member;
   (g) the left signal light assembly further comprising:
      a left barrel shaped housing having front and back open ends;
      a lamp stationed within the left barrel shaped housing;
      front and back lens coverings positioned over the front and back open ends, respectively, whereby the front and back lens coverings permit light produced from the lamp to pass therethrough; and
      the front and back lens coverings further comprise a colored, light penetrable material;
   (h) a seat mounting post on the bicycle;
   (i) a clamping means for removably attaching the cylindrical housing member to the seat mounting post on the bicycle;
   (j) the clamping means comprising a pair of opposing C-shaped clamps attached to the battery pack;
   (k) the clamps being tightened by turning a screw protruding through substantially straight portions of each of the opposing C-shaped clamps;
   (l) a switching circuit for selectively controlling illumination of the right and left signal light assemblies;
   (m) the switching circuit being electrically connected to the right and left signal light assemblies;
   (n) a handle bar assembly on the bicycle;
   (o) the switching circuit further comprising:
      a battery;
      a battery pack assembly containing the battery therein;
      the battery pack assembly being firmly attached to the front surface of the cylindrical housing member; and
      a switch unit, for mounting on the handle bar assembly on the bicycle, comprising;
         a generally square shaped switch housing;
         a top surface of the switch housing; and
         a toggle lever switch protruding from the top surface of the switch housing;
         the toggle lever switch comprising:
            a right signal illumination position to intermittently illuminate only the right signal light assembly in a flashing manner; and
         a left signal illumination position to intermittently illuminate only the left signal light assembly in a flashing manner;
         a plurality of pushbutton switches mounted on a front surface of the switch housing; one of the pushbuttons controlling the simultaneous illumination of both the right and left signal light assemblies in a flashing, intermittent manner; and another of the pushbuttons controls the simultaneous illumination of both the right and left signal light assemblies in a continuous, constantly illuminated manner;

electrical wiring in the switching circuit;

the electric wiring connecting the switch unit to the battery pack assembly and connecting the switch unit to each of the right and left signal light assemblies; and (p) an electrically operated horn which is firmly attached to a rear surface of the cylindrical housing, the horn being activated by a third of the pushbuttons mounted to the front surface of the switch housing.

* * * * *